US008753525B2

(12) United States Patent
Yushin

(10) Patent No.: US 8,753,525 B2
(45) Date of Patent: Jun. 17, 2014

(54) MICROPOROUS CARBONS WITH ALIGNED PORES FOR SUPERCAPACITORS

(71) Applicant: Sila Nanotechnologies Inc., Atlanta, GA (US)

(72) Inventor: Gleb Nikolayevich Yushin, Atlanta, GA (US)

(73) Assignee: Sila Nanotechnologies Inc., Atlanta, GA (US)

(*) Notice: Subject to any disclaimer, the term of this patent is extended or adjusted under 35 U.S.C. 154(b) by 0 days.

(21) Appl. No.: 13/781,429

(22) Filed: Feb. 28, 2013

(65) Prior Publication Data

US 2013/0220974 A1    Aug. 29, 2013

Related U.S. Application Data

(60) Provisional application No. 61/604,402, filed on Feb. 28, 2012.

(51) Int. Cl.
| H01G 4/00 | (2006.01) |
| H01G 5/00 | (2006.01) |
| H01G 7/00 | (2006.01) |
| H01G 9/00 | (2006.01) |
| H01G 13/00 | (2013.01) |

(52) U.S. Cl.
USPC .............................................. 216/6; 216/56

(58) Field of Classification Search
None
See application file for complete search history.

(56) References Cited

U.S. PATENT DOCUMENTS

| 6,495,258 B1* | 12/2002 | Chen et al. ................. 428/408 |
| 2009/0053512 A1* | 2/2009 | Pyun et al. ................. 428/336 |
| 2010/0099319 A1* | 4/2010 | Lashmore et al. .......... 442/332 |
| 2010/0329964 A1* | 12/2010 | Roos ......................... 423/445 B |

OTHER PUBLICATIONS

Chmiola, J.; Yushin, G.; Gogotsi, Y.; Portet, C.; Simon, P., "Anomolous Increase in Carbon Capacitance at Pores Less Than 1 Nanometer," Science, vol. 313, pp. 1760-1763, Sep. 22, 2006.
Yushin, G.; Nikitin, A.; Gogotsi, Y., "Carbide Derived Carbon," Nanomaterials Handbook, Gogotsi, Y., Ed. CRC Press: 2006; pp. 239-282.
Chmiola, J.; Largeot, C.; Taberna, P. L.; Simon, P.; Gogotsi, Y., "Desolvation of Ions in Subnanometer Pores and Its Effect on Capacitance and Double-Layer Theory," Angewandte Chemie-International Edition 2008, 47, pp. 3392-3395.
Miller, John R. and Simon, Patrice, "Electrochemical capacitors for energy management," (2008) Science Magazine, vol. 321 (No. 5889), pp. 651-652.
Portet, C.; Yushin, G.; Gogotsi, Y., "Electrochemical performance of carbon onions, nanodiamonds, carbon black and multiwalled nanotubes in electrical double layer capacitors," Carbon 2007, 45, pp. 2511-2518.

(Continued)

*Primary Examiner* — Duy Deo
(74) *Attorney, Agent, or Firm* — Muncy, Geissler, Olds & Lowe, P.C

(57) ABSTRACT

A microporous carbon matrix material composition for use in supercapacitor electrodes may be produced by depositing carbon on a sacrificial zeolite template via one of several methods (e.g., hydrothermal or solvo-thermal deposition, sub-atmospheric vapor phase deposition, or high-pressure infiltration of hydrocarbon vapors). The deposition produces a carbon-coated zeolite intermediary. A surface layer of carbon formed on the carbon-coated zeolite intermediary may then be refined and the refined carbon-coated zeolite intermediary may be etched to produce a microporous carbon matrix having a substantially uniform structure and substantially aligned pores. In some embodiments, the carbon-coated zeolite intermediary may be annealed after deposition.

20 Claims, 12 Drawing Sheets

(56) References Cited

OTHER PUBLICATIONS

Conway, B. E., "The Double Layer at Capacitor Electrode Interfaces: Its Structure and Capacitance," Electrochemical Supercapacitors, Ch. 6, Kluwer Academic / Plenum Publishers: New York, 1999, vol. 1.

Korenblit, Y.; Rose, M.; Kockrick, E.; Borchardt, L.; Kvit, A.; Kaskel, S.; Yushin, G., "High-Rate Electrochemical Capacitors Based on Ordered Mesoporous Silicon Carbide-Derived Carbon," Acs Nano 2010, 4, pp. 1337-1344.

Zheng, J. P.; Jow, T. R., "Hydrous Ruthenium Oxide as an Electrode Material for Electrochemical Capacitors," J. Electrochem. Soc. 1995, 142, L6-L8.

Nishihara, H.; Itoi, H.; Kogure, T.; Hou, P. X.; Touhara, H.; Okino, F.; Kyotani, T., "Investigation of the Ion Storage/Transfer Behavior in an Electrical Double-Layer Capacitor by Using Ordered Microporous Carbons as Model Materials," Chemistry—a European Journal 2009, 15, pp. 5355-5363.

Simon, P.; Gogotsi, Y., "Materials for electrochemical capacitors," Nature Materials 2008, 7, pp. 845-854.

Raymundo-Pinero, E.; Kierzek, K.; Machnikowski, J.; Beguin, F., "Relationship between the nanoporous texture of activated carbons and their capacitance properties in different electrolytes," Carbon 2006, 44, pp. 2498-2507.

Kajdos, A.; Kvit, A.; Jones, F.; Jagiello, J.; Yushin, G., "Tailoring the Pore Alignment for Rapid Ion Transport in Microporous Carbons," J. Am. Chem. Soc. 2010, 132, pp. 3252.

* cited by examiner

MICROPOROUS CARBONS WITH ALIGNED PORES FOR SUPERCAPACITORS

CLAIM OF PRIORITY UNDER 35 U.S.C. §119

The present application for patent claims priority to Provisional Application No. 61/604,402 entitled "Microporous Carbons with Aligned Pores for Supercapacitors" filed on Feb. 28, 2012, which is expressly incorporated by reference herein.

GOVERNMENT LICENSE RIGHTS

This invention was made with government support under Award ID 1046948 awarded by the National Science Foundation. The government has certain rights in the invention.

BACKGROUND

1. Field

The present disclosure relates generally to energy storage devices, and more particularly to supercapacitor technology and the like.

2. Background

The success of a future energy-efficient economy largely depends on our ability to develop novel materials with greatly improved characteristics for electrical energy storage and delivery. FIG. 1 is a chart illustrating various power and energy densities in modern electrical energy storage devices. For reasons evident here, supercapacitors have recently attracted much attention and are taking on increased importance in applications where long operational lifetime, high power, and low weight are essential, including hybrid electrical vehicles (HEV), energy-efficient hybrid industrial equipment, elevators, mobile electronic devices, power quality devices, current instability leveling devices in smart electrical grids, and peak power sources for military applications. Supercapacitors may also be useful in delivering high currents for rapid heating or quick high-intensity lighting (e.g., flashes in cameras, on-demand night lighting for roads, etc.), sending strong electromagnetic radio signals, triggering chemical reactions, and even launching rockets. They may also greatly increase the lifetime of batteries or fuel cells if used jointly with such energy storage/conversion devices.

Supercapacitors are rechargeable electrochemical energy storage devices similar to batteries, but with different performance characteristics. Supercapacitors can store more energy in a smaller volume and often at a lower cost. In contrast to batteries, supercapacitors may operate efficiently in a large temperature window (e.g., from about −40 to +300° C., depending on the electrolyte used), have an incredibly long cycle life (typically greater than 100,000 cycles), and can often be charged in less than about a second. Such properties are unattainable in Li-ion batteries, for example. Additionally, in contrast to Li-ion batteries, open damage to the cell of a supercapacitor does not cause a fire. They are also much more environmentally friendly.

There are generally two types of supercapacitors that are commercially available. FIG. 2 illustrates a first type of commercially available supercapacitor, namely a traditional electrical double layer capacitor (EDLC) with carbon electrodes. The charge storage mechanism in a pure EDLC is non-Faradaic. During charging and discharging of an EDLC, no charge transfer takes place across the electrode/electrolyte interface and the energy storage is electrostatic in nature. As shown, an EDLC consists of two electrodes 202, 204 immersed in an electrolyte 206 and separated by an ion-conducting but electron-blocking membrane 208. Upon application of an electrical potential to one of the electrodes, ions of opposite sign accumulate on the electrode surface in a quantity proportional to the applied voltage, forming a so-called electrical double layer. This double layer consists of an electrical space charge from the electrode side and an ion space charge from the electrolyte side. The values for the double layer capacitance normalized per unit area generally vary from about 3 to about 30 $\mu F/cm^2$.

A second type of commercially available supercapacitor is a so-called pseudocapacitor with expensive hydrous ruthenium oxide ($RuO_2 \cdot nH_2O$) electrodes. While pseudocapacitors based on conductive metal oxides (such as $RuO_x$) and conductive polymers may offer higher capacitance per unit mass, they also suffer from shorter lifetimes, higher costs, and most importantly, a lower operational voltage range. Since common organic electrolytes are mostly not electrochemically (Faradaically) active with metal oxides or polymers, pseudocapacitors are instead typically built with aqueous electrolytes. This leads to a lower operational voltage, however, due to the decomposition of $H_2O$ in aqueous electrolytes at voltages in excess of 1V.

Carbon-based supercapacitors (EDLC) are therefore believed to offer a more practical solution for many energy storage applications. Since the energy storage of a supercapacitor is proportional to the square of the voltage ($E=0.5 \ C \cdot V^2$), increasing the voltage from 1V (aqueous electrolytes commonly used in pseudocapacitors) to about 2.5V-4V (organic electrolytes or ionic liquids commonly used in carbon-based EDLCs) results in higher energy density in spite of the lower capacitance of carbon. An additional advantage of carbon-based supercapacitors is their much faster charge-discharge kinetics.

Nevertheless, there remains a need for improved carbon-based supercapacitors, components, and other related materials and manufacturing processes thereof.

SUMMARY

Embodiments disclosed herein address the above stated needs by providing improved supercapacitors, components, and methods of making and using the same. According to various embodiments, a microporous carbon matrix material composition for use in supercapacitor electrodes may be produced by depositing carbon on a sacrificial zeolite template via one of several methods (e.g., hydrothermal or solvo-thermal deposition, sub-atmospheric vapor phase deposition, or high-pressure infiltration of hydrocarbon vapors). The deposition produces a carbon-coated zeolite intermediary. A surface layer of carbon formed on the carbon-coated zeolite intermediary may then be refined and the refined carbon-coated zeolite intermediary may be etched to produce a microporous carbon matrix having a substantially uniform structure and substantially aligned pores. In some embodiments, the carbon-coated zeolite intermediary may be annealed after deposition.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

As discussed in the background above, rapid technological developments require lowering the cost and improving the specific power of carbon-based supercapacitors without substantially sacrificing their specific energy characteristics. Conventional supercapacitor electrodes are based on activated carbons, which suffer from: (a) tortuous pores and relatively slow charge and discharge (typically about 10-100 seconds), (b) large inconsistency of properties (particularly if produced from natural precursors, such as coconut shells), (c) relatively low capacitance (typically about 50-120 F/g in organic electrolytes), and (d) relatively high cost (e.g., about $20-40/kg if produced from natural precursors and about $100-160/kg if produced from synthetic precursors).

Accordingly, the present disclosure provides for the synthesis and use of low cost (e.g., below about $5/kg) zeolite-templated microporous carbons using advanced deposition techniques such as low-pressure (e.g., sub-atmospheric) vapor deposition, high-pressure vapor phase deposition, or hydrothermal or solvo-thermal deposition. In contrast to conventional liquid phase infiltrations of carbon precursors into zeolite particles, the produced microporous carbons provided herein have a substantially uniform microstructure and aligned pores, highly reproducible performance, high specific capacitance (e.g., greater than about 150 F/g in organic electrolytes), and ultra-fast charging capabilities (e.g., between about 0.1-1 seconds). Apart from the replacement of associated carbon materials, many embodiments herein do not require any other modification in the design of supercapacitor devices, facilitating relatively seamless adoption by supercapacitor manufacturers.

Production of Zeolite-Templated Carbon

Figure 1:
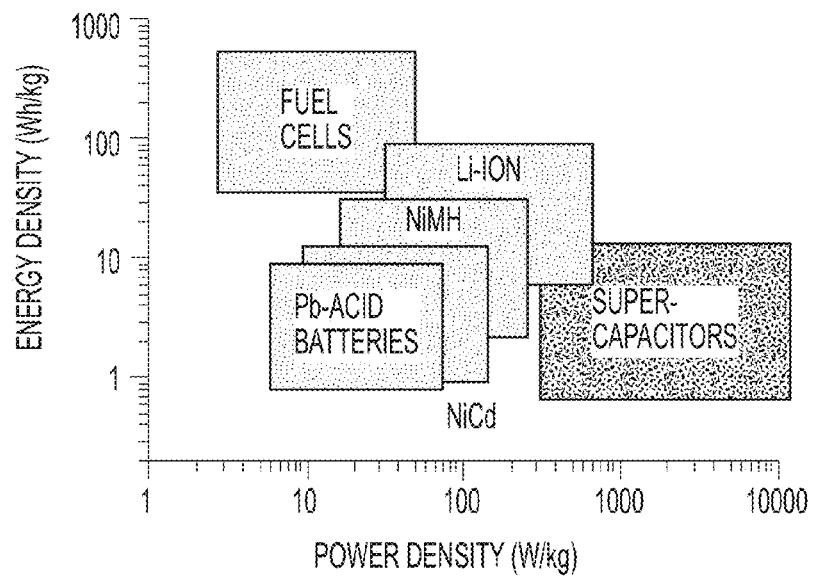
FIG. 1 is a chart illustrating various power and energy densities in modern electrical energy storage devices.
Figure 2:
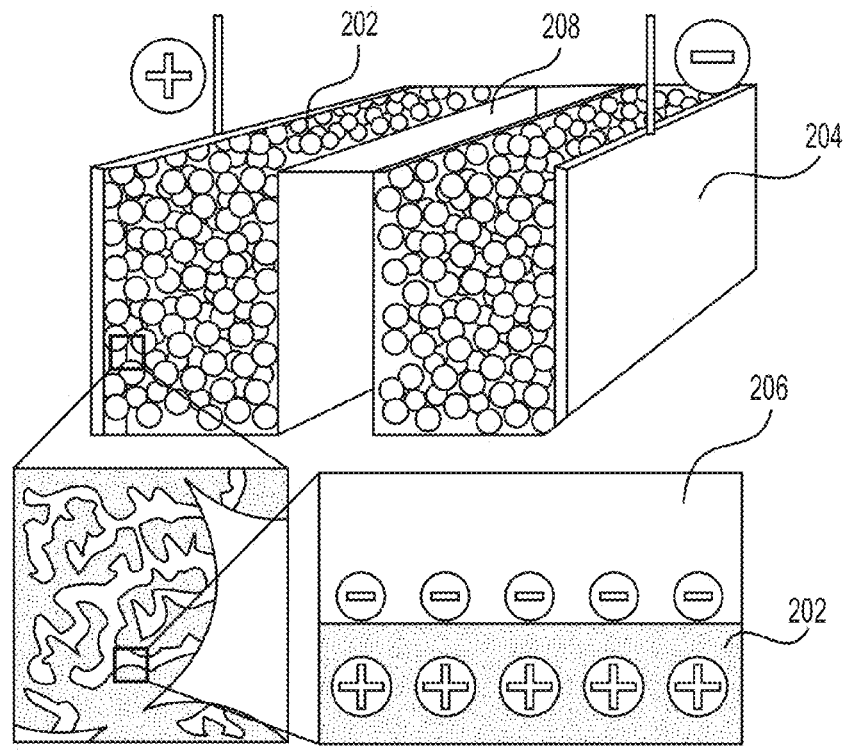
FIG. 2 illustrates a traditional electrical double layer capacitor (EDLC) with carbon electrodes.
Figure 3:
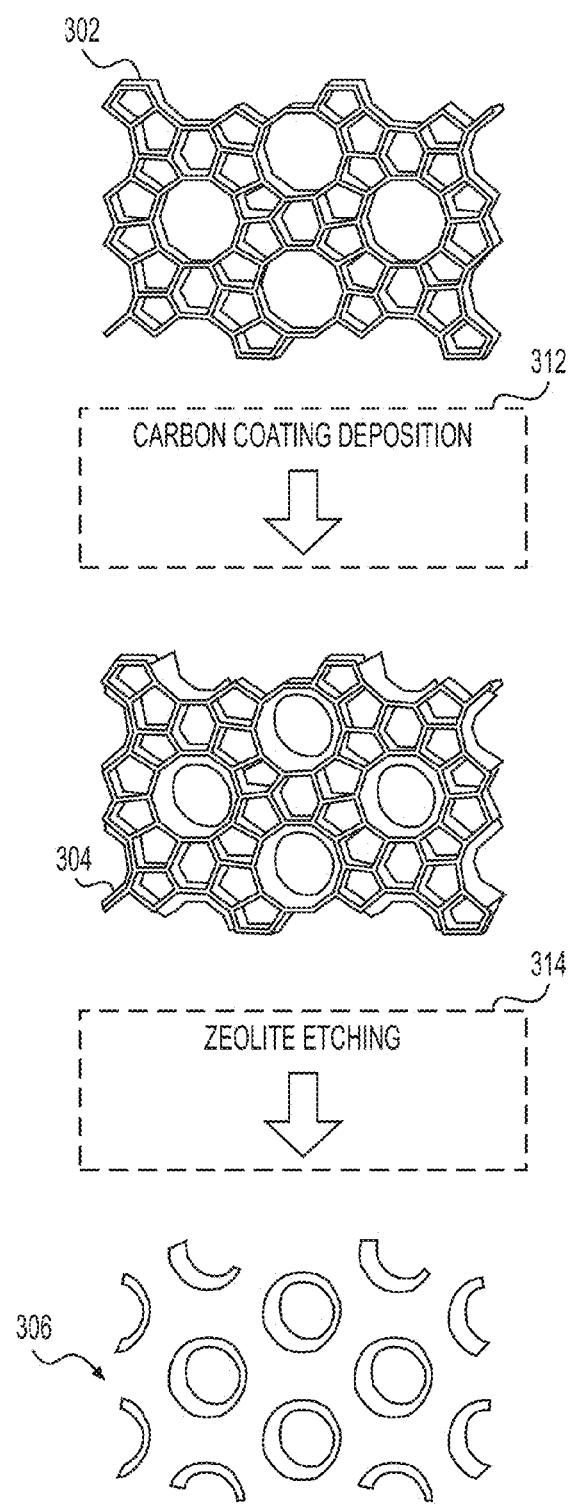
FIG. 3 is a graphical flow diagram illustrating the production of zeolite-templated microporous carbons according to an embodiment of the present invention.

FIG. 3 is a graphical flow diagram illustrating the production of zeolite-templated microporous carbons according to an embodiment of the present invention. As shown, carbon monolayers 302 may be deposited on the surface of a sacrificial zeolite template 304 via one of several deposition techniques as described below (block 312), followed by zeolite etching (block 314) to produce nanostructured carbons 306. The uniformity of the produced carbons is markedly improved by utilizing these advanced deposition techniques as compared to utilizing liquid carbon precursors (such as sucrose dissolved in water or melt-infiltrated into porous zeolite particles).

For example, the use of low or sub-atmospheric pressure (e.g., less than about 50 Torr, or more preferably less than about 10 Torr) vapor phase deposition under a flow of hydrocarbon gas can be particularly attractive for achieving high structural uniformity and a low concentration of defects within the deposited carbon layer. Uniform deposition can be achieved by tuning the deposition conditions in such a way that the zeolite surface catalyzes the deposition of a monolayer of carbon by thermal decomposition of a hydrocarbon precursor, while the pressure and temperature conditions may be tuned to achieve a mean path of the hydrocarbon precursor molecules within the zeolite particle (prior to decomposition to form the carbon layer) that is larger than the zeolite particle size. Acetylene and methane are examples of hydrocarbon precursors that may be used for carbon deposition. It has been found that a suitable temperature range here for carbon deposition from the vapor phase may be from around 700 to around 1000° C.

In other embodiments, the inventor(s) has discovered that it may be advantageous to deposit the carbon layer on the zeolite surface at high pressures (e.g., higher than 3 atmospheres, or more preferably higher than 10 atmospheres) by using hydrothermal or solvo-thermal carbon deposition techniques. This approach may provide faster deposition times, lower deposition temperatures, and lower carbon deposition costs. A hydrothermal carbon deposition process may include, for example, a heat treatment of an aqueous solution/dispersion of organic materials under autogeneous pressure at temperatures as low as 150 to 350° C. In a solvo-thermal carbon deposition process, a non-aqueous solution of an organic material may be used instead. In either case, the resulting solid carbon products (termed "hydrochars") generally exhibit uniform chemical and structural properties as well as a very high (and tunable) content of oxygen-containing functional groups.

Hydrochar materials generally have low or almost no open porosity, and heat-treatments at elevated temperatures may only lead to moderate increases in surface area. Thus, hydrothermal carbonization has been commonly believed to have only limited use in surface area-sensitive applications. The inventor(s) has discovered, however, that the techniques described herein can surprisingly be used to produce highly porous carbon with attractive properties when, for example, the carbon is deposited on a sacrificial zeolite template, followed by annealing under an inert gas flow or under vacuum, and further followed by etching of the zeolite template. It has been found that a suitable temperature range for the carbon deposition using hydrothermal or solvo-thermal methods may be from around 150 to around 400° C., depending on the carbon precursor and the solvent utilized. The inventor(s) has further discovered that both hydro-thermal and solvo-thermal carbon deposition methods may be enhanced by annealing the carbon-coated zeolite intermediary in the range of about 750° C. to about 1000° C., in order to induce a desired ordering of the carbon structure and remove undesired impurities that may be introduced from either the solvent or the carbon precursor(s).

Figure 4:
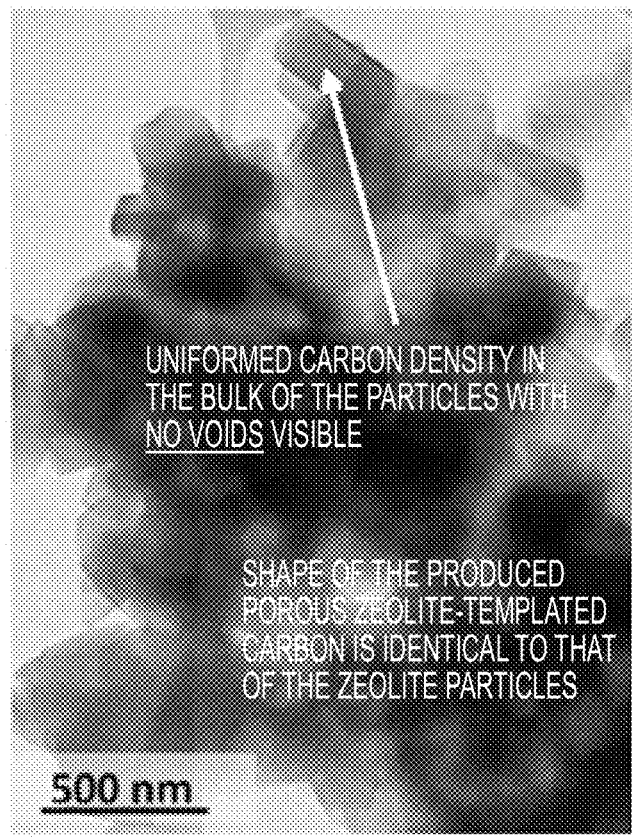
FIG. 4 is a transmission electron microscopy (TEM) micrograph showing a relatively uniform microstructure/density in the bulk of example zeolite-templated carbons produced via vapor phase deposition.
Figure 5:
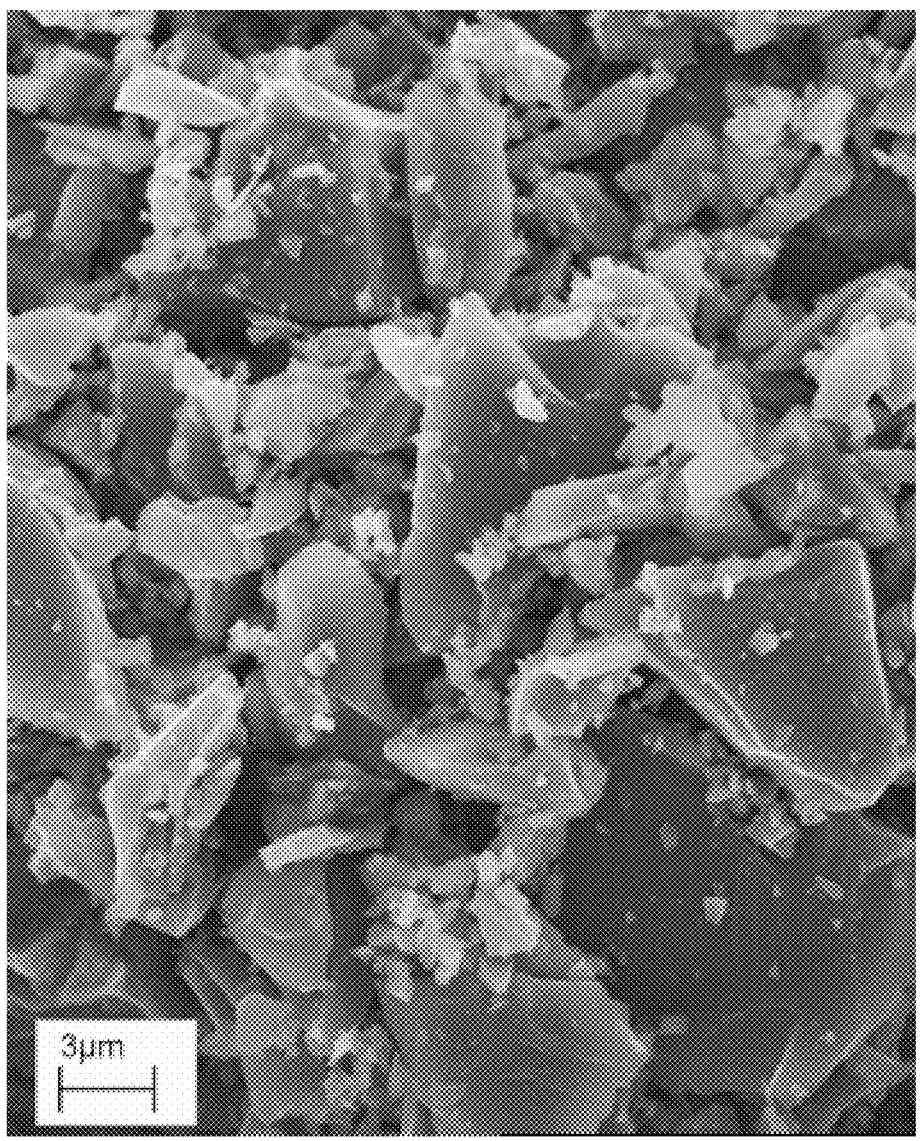
FIG. 5 illustrates example zeolite-templated carbons produced via liquid phase infiltration and carbonization of organic precursors.

FIG. 4 is a transmission electron microscopy (TEM) micrograph showing a relatively uniform microstructure/density in the bulk of example zeolite-templated carbons produced via vapor phase deposition. For comparison, FIG. 5 illustrates example zeolite-templated carbons produced via liquid phase infiltration and carbonization of organic precursors. The liquid phase infiltrated carbons exhibit relatively low surface area (e.g., less than about 600 m$^2$ g$^{-1}$) and relatively low specific capacitance (e.g., less than about 50 F g$^{-1}$), which may be due to the high interface energy between the hydrophilic zeolite surface and the liquid carbon precursor, preventing complete precursor wetting and uniform distribution of the precursor molecules within the 1 nm level pores of the zeolite particles. Performing the infiltration procedure under vacuum or utilizing a catalyst for the precursor decomposition leads to similar results.

Accordingly, as can be seen here, the use of gaseous precursors (FIG. 4) provides for the formation of higher-quality carbon replicas of zeolite particles than those achieved via liquid phase precursors at atmospheric pressures (FIG. 5). The use of hydrothermal and solvo-thermal techniques for carbon deposition within zeolite pores also allows for the formation of relatively high quality carbon replicas of zeolite particles.

Figure 6:
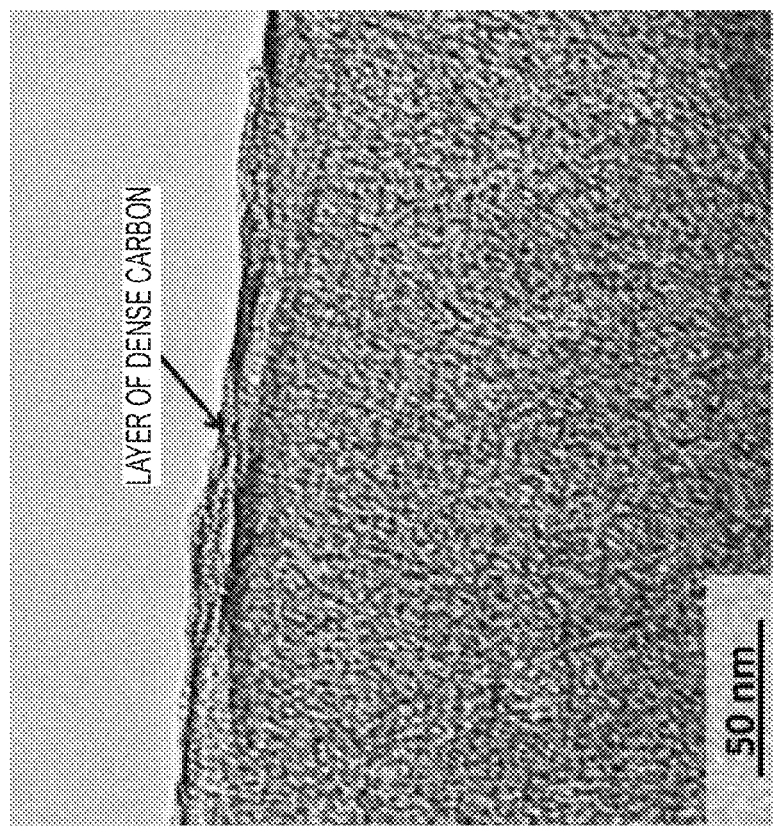
FIG. 6 is a TEM micrograph showing a dense layer of carbon on the surface of example carbon particles produced via vapor phase deposition.

However, the inventor(s) has discovered that vapor phase synthesized carbons as well as zeolite-templated carbons produced in the course of high pressure, hydrothermal or solvo-thermal carbon deposition tend to form an additional thin (e.g., less than about 5 nm) yet dense layer of carbon on the surface of the resulting structures that may impede rapid diffusion of organic electrolyte ions into and out of the bulk of the porous carbon particles. FIG. 6 is a TEM micrograph showing a dense layer of carbon on the surface of example carbon particles produced via vapor phase deposition. While such a surface layer is porous and may not significantly affect the diffusion of small ions when aqueous electrolytes are used, the movement of larger ions present in organic electrolytes, for example, becomes more significantly impeded. As a result, the electrolyte-accessible internal surface area becomes smaller and the performance of the produced particles in organic electrolytes may be noticeably inferior to that in aqueous electrolytes.

Several techniques are described below that may be used, individually or in combination, to refine this surface layer so as to substantially remove it or otherwise ameliorate its effects. The refinement process(es) increases both the accessible surface area (and thus the specific capacitance of the produced porous carbon particles) and the rate of ion motion inside the internal pores of the produced structures. In this way, embodiments provided herein may be used in organic electrolytes as well as aqueous electrolytes, leading to longer cycle life, higher operational voltage, and higher energy densities, and making them particularly attractive for industrial supercapacitor production.

Refinement of the Surface Layer via Activation

In order to reduce the effects of the carbon surface layer, in some embodiments, the pores in this layer may be enlarged by mild physical activation. For example, powder samples of the produced structures may be heated to a desired temperature (e.g., in the range of about 700-900° C.) in a furnace under an Ar flow (e.g., at a rate of about 300 ml min$^{-1}$ or more). Once the target temperature is achieved, the Ar flow may be halted and a $CO_2$ gas (e.g., at about 99.9% pure), for example, may be flowed to activate the carbon (e.g., at a rate of about 150-300 ml min$^{-1}$). The powder may be subsequently unloaded after cooling (e.g., to room temperature under an Ar atmosphere).

It may be advantageous to perform activation on the carbon-coated zeolite before etching the zeolite template (e.g., between steps 312 and 314 in FIG. 3). For already synthesized zeolite-templated carbons, such activation may be limited, because the internal carbon structure may be substantially or completely oxidized before sufficient pores can be formed in the outer layer. This may be due to the surface layer having a more ordered structure than the internal one.

Selected results are shown below for porous carbons produced via: (a) carbon deposition, (b) optional annealing at elevated temperature (e.g., about 700-1000° C.), (c) activation, and (d) zeolite etching, purification and drying. In these and other examples, the $N_2$ adsorption isotherms were measured at −196° C. using a TriStar II 3020 surface area and porosity analyzer. Prior to the measurement, the powder samples were degassed at 300° C. for at least 4 hours using a VacPrep 061 degasser. The specific surface area (m$^2$ g$^{-1}$) was calculated using the Brunauer, Emmett, and Teller (BET) method. The PSDs were determined via the density functional theory (DFT) methods using nitrogen adsorption data.

TABLE 1

| Sample | Time (min) | $CO_2$ (ml/min) | Temp (° C.) | $S_{BET}$ (m$^2$ g$^{-1}$) | Pore volume (cm$^3$ g$^{-1}$) |
|---|---|---|---|---|---|
| C30m900 | 30 | 300 | 900 | 210 | 0.08 |
| C20m900 | 20 | 150 | 900 | 445 | 0.18 |
| C15m900 | 15 | 150 | 900 | 522 | 0.21 |
| C20m800 | 20 | 150 | 800 | 1644 | 0.74 |
| C15m800 | 15 | 150 | 800 | 2394 | 1.13 |
| C10m800 | 10 | 150 | 800 | 1734 | 0.82 |
| C15m700 | 15 | 150 | 700 | 1940 | 0.88 |

Table 1 shows example measurements and parameters for select zeolite-templated carbons. The BET specific surface area is one of the more important parameters for achieving good performance of the porous carbons in surpercapacitors.

As shown, tuning the activation time, temperature, and flow rate of the activation agent allows for optimizing the surface area of the produced carbon, which has been shown to reach nearly 2400 $m^2\,g^{-1}$, close to the theoretical surface area of graphene (2600 $m^2\,g^{-1}$).

Advantageous electrochemical performance in supercapacitor devices has been similarly demonstrated in embodiments employing this technique. In one design, the produced powders were incorporated into supercapacitor devices according to the following procedure. Carbon powder was mixed with polytetrafluoroethylene (PTFE) as a binder in a ratio of approximately 9:1 in ethanol to form a slurry, which was stirred to uniformly mix the powder. The mixed and dried carbon-PTFE composite was then rolled into a 200 μm thick electrode. The produced electrode was dried in a vacuum oven (at about 100° C.) for at least 12 hours and cut into a ½ inch diameter circles. Coin cells were assembled inside an Ar-filled glove box. Two symmetrical electrodes were separated by two overlapping 25 μm separators, attached to respective current collectors, and assembled into cells. The current collectors were prepared by spray coating of graphite on 300 μm thick Al foil. For the electrolyte, a 1M tetraethylammonium tetrafluoroborate ($TEABF_4$)/acetonitrile (AN) solution was employed. A similar procedure was employed for the preparation and use of conventional electrodes from commercially available powders for comparison purposes.

Figure 7:
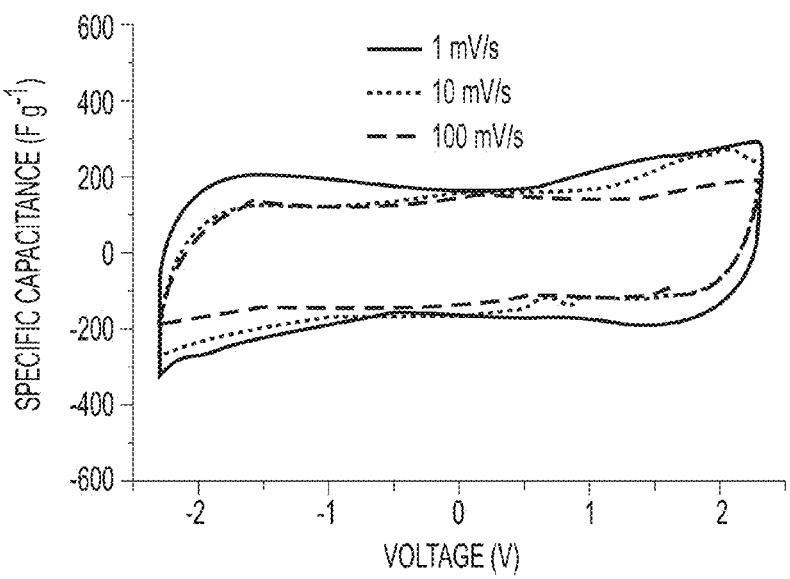
FIG. 7 shows an example cyclic voltammetry (CV) curve recorded for select zeolite-templated carbon samples produced using an activation step during synthesis.

FIG. 7 shows an example cyclic voltammetry (CV) curve recorded for select zeolite-templated carbon samples produced in this way using an activation step during synthesis. The CV measurements were recorded using a Solartron 1480A MultiStat in the voltage range of −2.3 V to +2.3 V with scan rates of 1 to 500 mV $s^{-1}$. The gravimetric capacitance, C (F $g^{-1}$), was calculated according to $$C = \frac{2I}{\left(\frac{dV}{dt}\right)m} \quad \text{(Eq. 1)}$$

where I is the current (A), dV/dt is the scan rate (V $s^{-1}$), and m is the mass (g) of carbon in each electrode.

Figure 8:
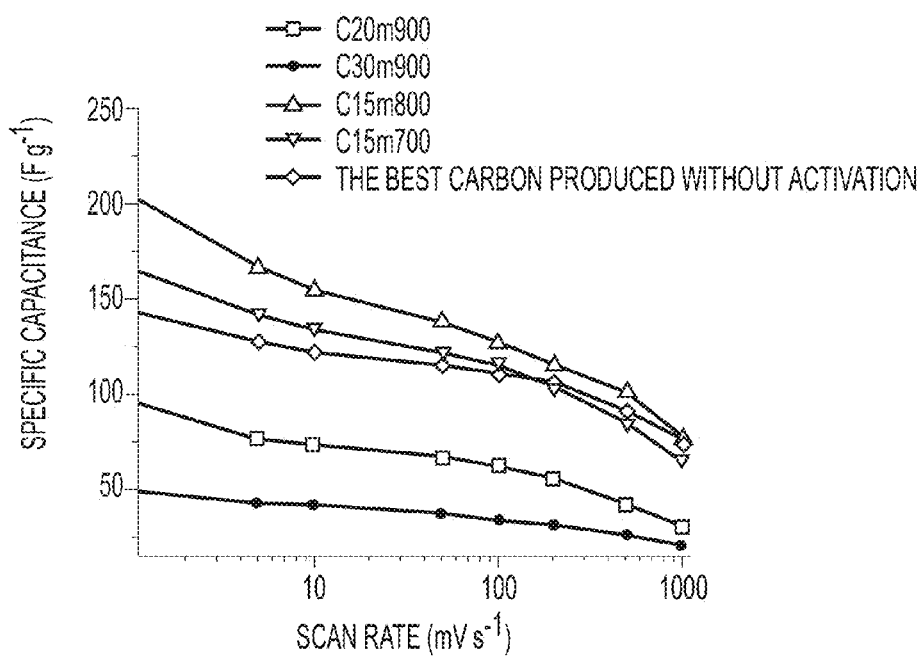
FIG. 8 illustrates the effect of activation on specific capacitance at different scan rates.

FIG. 8 illustrates the effect of the activation on the specific capacitance at different scan rates. As shown, while the samples activated at 900° C. resulted in a relatively low specific capacitance, the samples activated at 700° C. and 800° C. showed improved specific capacitances. Among the activated samples, C15m800 showed the highest specific capacitance of 204 F $g^{-1}$ at a sweep rate of 1 mV $s^{-1}$.

Figure 9:
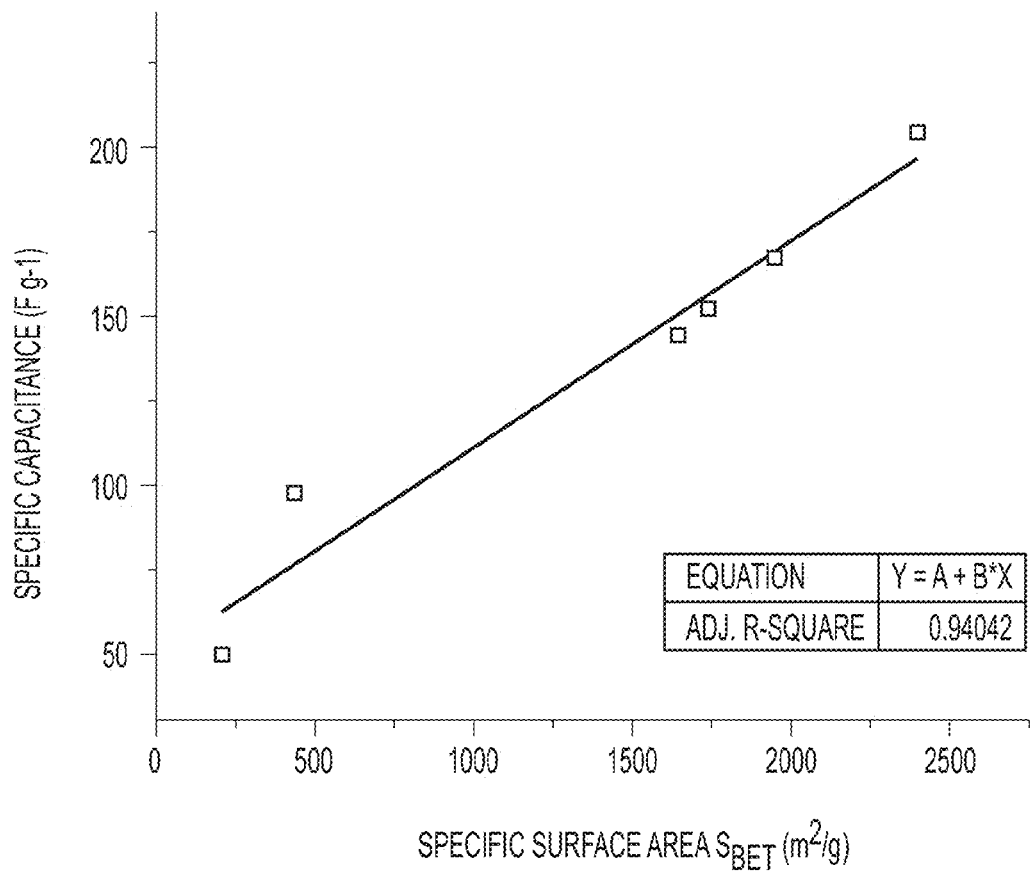
FIG. 9 illustrates the virtually linear relationship between specific capacitances and specific surface area of activated zeolite-templated carbons.

FIG. 9 illustrates the virtually linear relationship between specific capacitances and specific surface area of activated zeolite-templated carbons. The achieved values of specific capacitance have been found to correlate well with the specific surface area of the produced carbons.

Figures 10A, 10B:
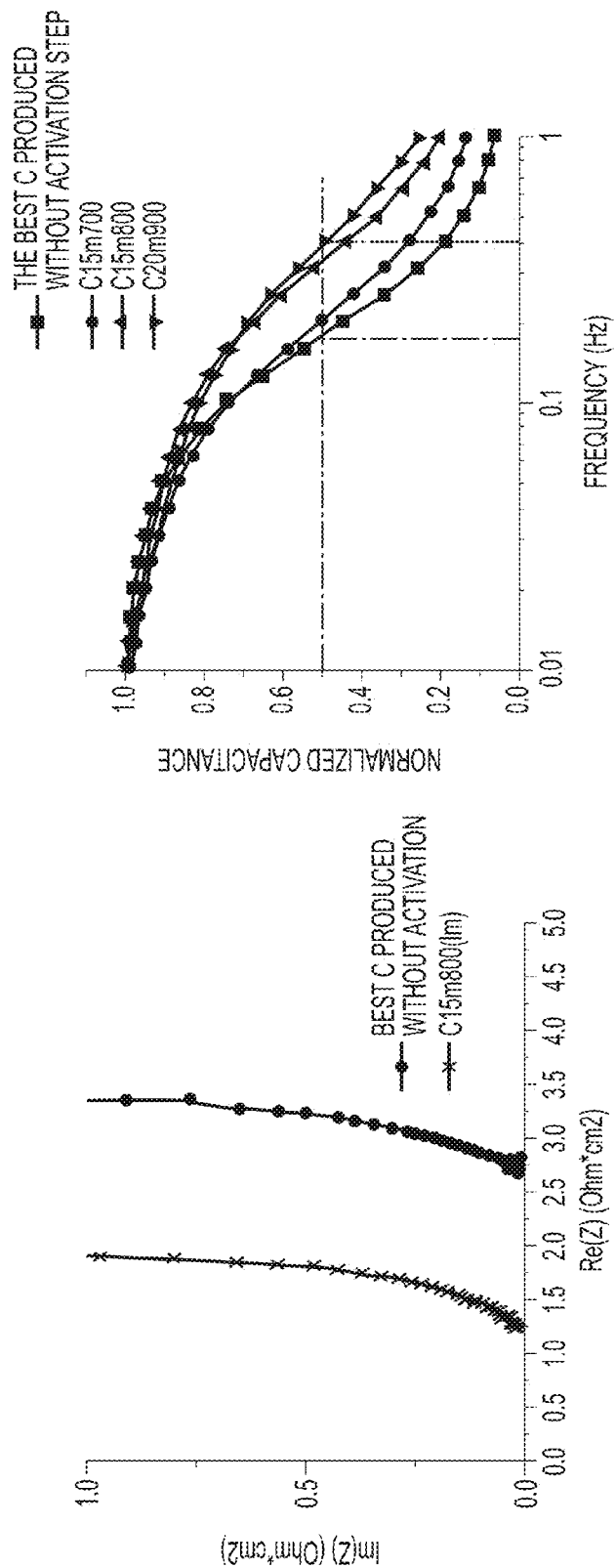
FIG. 10 illustrates selected results of electrochemical impedance spectroscopy (EIS) measurements as (a) Nyquist plots and (b) normalized capacity retention with increasing operating frequency.

FIG. 10 illustrates selected results of electrochemical impedance spectroscopy (EIS) measurements as (a) Nyquist plots and (b) normalized capacity retention with increasing operating frequency. The EIS measurements were carried out using a Gamry reference 600 potentiostat in a frequency range of 1 mHz-100 kHz. The gravimetric capacitance, C (F $g^{-1}$), was calculated from EIS data according to $$C = \frac{2|Im(Z)|}{2\pi f[(Im(Z))^2 + (Re(Z))^2]m} \quad \text{(Eq. 2)}$$

where f is the operating frequency (Hz), Im(Z) and Re(Z) are the imaginary and real parts of the total device resistance (ohm), and m is the mass (g) of carbon in each electrode. The C15m800 sample exhibiting the highest capacitance showed no semi-circuit loop at high frequencies and very low equivalent series resistance (ESR), which is critical for high-power applications. Its ESR value was nearly half that of the best sample produced without an activation step.

Refinement of the Surface Layer via Ball Milling

While an activation procedure clearly improves performance, it may disadvantageously complicate large-scale production and produce harmful greenhouse gases ($CO_2$, CO). Therefore, as an alternative mechanism for removing the surface layer, other embodiments may employ a scalable low cost route—ball milling. In order to preserve the ordered pore structure of the zeolite-templated carbons, the ball milling may again be performed on the carbon-coated zeolite before etching the zeolite template (e.g., between steps 312 and 314 in FIG. 3).

Select device characteristics are provided below for several example designs produced using ball milling according to various embodiments. For most of these examples, a powder sample of carbon-coated zeolite was placed together with twelve 6 mm diameter stainless steel balls into a 50 ml vacuum jar. Processing was performed in an Ar-filled glove box in order to avoid possible oxidation during the ball milling process. An assembled vacuum jar was installed in ball mill equipment and both the rotating speed and time were varied.

Figure 11:
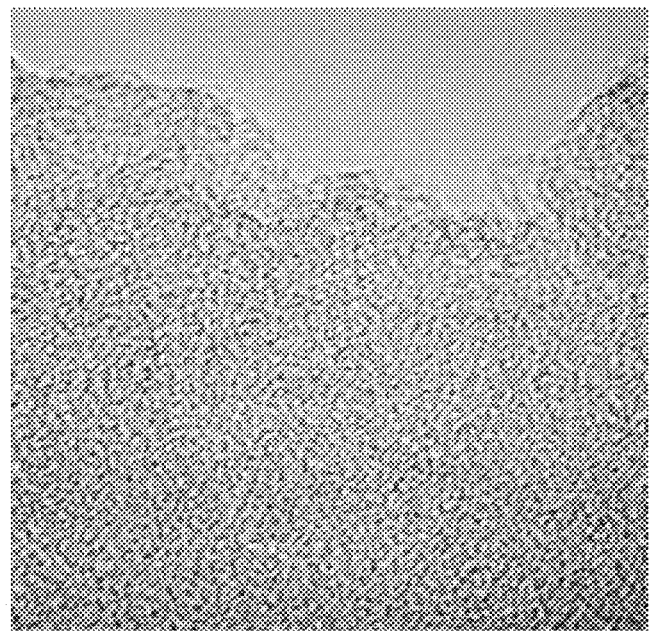
FIG. 11 is a high resolution TEM micrograph of the edge of an example particle produced via ball milling.
Figure 12:
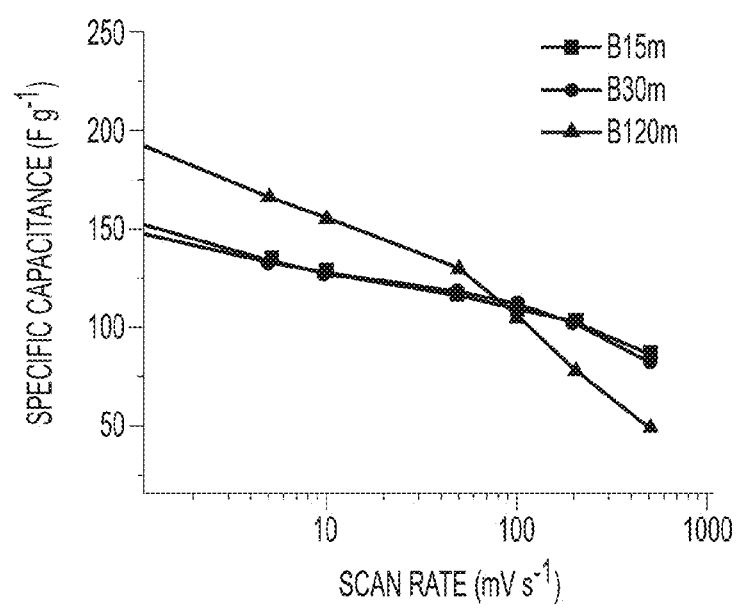
FIG. 12 illustrates the effect of ball milling on specific capacitance at different scan rates.

FIG. 11 is a high resolution TEM micrograph of the edge of an example particle produced in this way via ball milling. The horizontal image dimension in FIG. 11 is approximately 80 nm. As can be seen here, no dense carbon surface layer is visible after the ball milling refinement. FIG. 12 illustrates the effect of the ball milling on the specific capacitance at different scan rates. The performance of the ball-milling produced carbons in supercapacitors is advantageous (FIG. 12), although it may be slightly inferior to the best carbons produced with the assistance of an activation step described above (FIG. 8).

Table 2 shows examples of the effects of the ball mill time on the porosity of the produced carbon powder. Ball milling post-synthesis treatments increased the specific surface area for all of the samples as compared to their initial (not ball-milled) state. However, for the particular rotating speed employed, the increase of specific surface area was found to saturate at around 30 minutes.

TABLE 2

| Sample | Time (min) | $S_{BET}$ ($m^2\,g^{-1}$) | Pore volume ($cm^3\,g^{-1}$) |
|---|---|---|---|
| B15m | 15 | 1725 | 0.80911 |
| B30m | 30 | 1944 | 0.91595 |
| B120m | 120 | 1918 | 0.91168 |

In still further embodiments, performance may be improved, for example, by performing annealing prior to ball milling. X-Ray diffraction (XRD) and TEM studies have revealed that the ball milling may disrupt the pore alignment and negatively impact the uniform microstructure of the zeolite-templated carbons in some cases. Annealing at high temperature in an inert environment helps to heal the defects in the carbon structure, which allows for improved retention of the pore alignment.

The annealing temperature may be varied to achieve the desired characteristics, but it has been found that a temperature in the range of about 800° C. to about 1000° C. produces good results. Select results in this range are shown below for designs in which a ball mill grinding time was fixed at 30 minutes. Influence of activation parameters on the carbon powder was determined by $N_2$ adsorption analyses. Table 3 shows select samples and their corresponding specific surface area ($m^2$ $g^{-1}$) and pore volume ($cm^3$ $g^{-1}$). It was found that specific surface area is strongly influenced by the annealing temperature. The highest specific surface area value here was obtained at 900° C.

TABLE 3

| Sample | Temperature (° C.) | $S_{BET}$ ($m^2 g^{-1}$) | Pore volume ($cm^3 g^{-1}$) |
| --- | --- | --- | --- |
| N800B | 800 | 2156 | 1.16275 |
| N900B | 900 | 2634 | 1.27628 |
| N950B | 950 | 1890 | 1.22733 |
| N1000B | 1000 | 2048 | 1.05391 |

Figure 13:
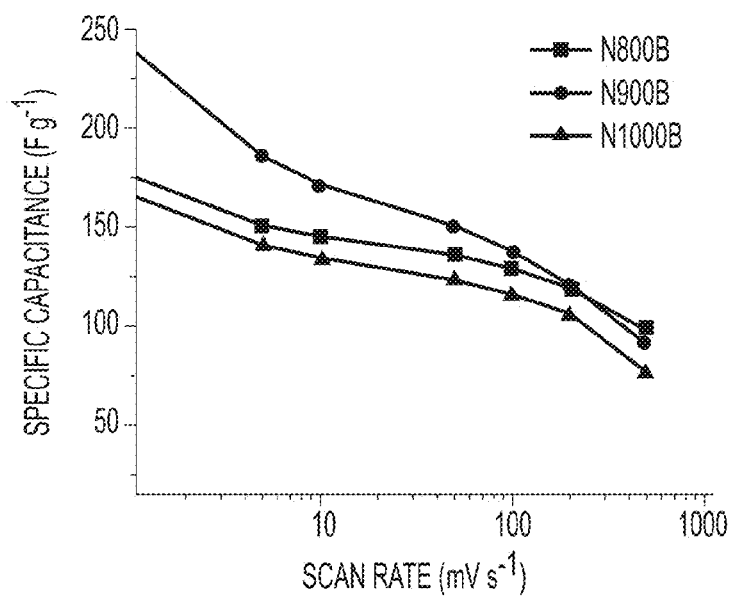
FIG. 13 shows specific capacitance values at different CV scan rates for ball-milled carbons prepared with different annealing temperatures.
Figure 14:
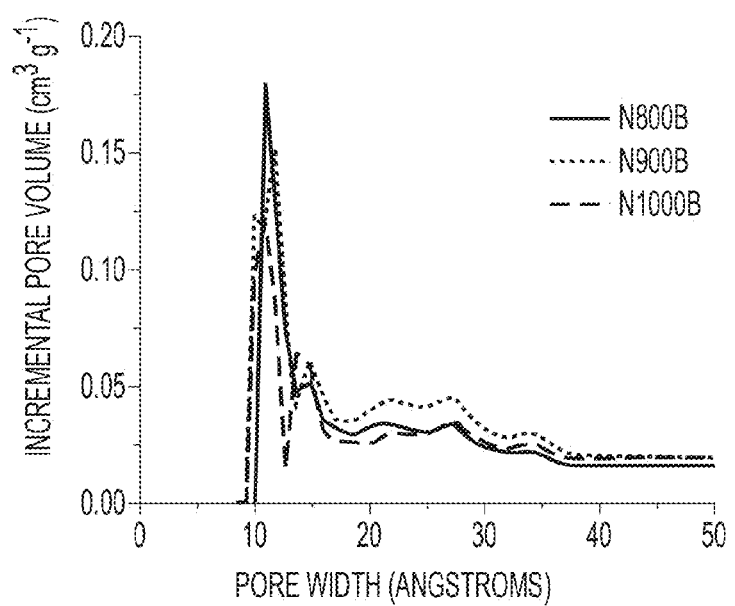
FIG. 14 shows an example pore size distribution graph for ball-milled carbons prepared with different annealing temperatures.

FIG. 13 shows specific capacitance values at different CV scan rates for the ball-milled carbons prepared with different annealing temperatures in Table 3. Sample N900B, having the largest specific surface area, showed the highest specific capacitance of 240 F $g^{-1}$ at a scan rate of 1 mV $s^{-1}$. FIG. 14 shows an example pore size distribution graph for the ball-milled carbons prepared with different annealing temperatures in Table 3. The surface area and pore size distribution were derived from an $N_2$ adsorption isotherm at −196° C.

The achieved values of specific capacitance (up to 240 F $g^{-1}$) are quite good (about 100-200% higher than that of commercial activated carbons optimized for use in commercial supercapacitor devices). Further, the ball milling process is very low cost, scalable, environmentally friendly, and does not lead to the losses of carbon that may arise from the activation processes.

Refinement of the Surface Layer via a Combination of Ball Milling and Mild Activation In still other embodiments, a porous carbon-coated zeolite may be refined using a combination of the activation and ball milling techniques above. For example, various combinations and instances of sequential post-synthesis annealing, ball milling, and activation procedures may be employed to produce a given design. Select characteristics for example embodiments produced using a ball mill grinding time fixed at 30 minutes and an activation condition fixed at 15 minutes using 150 ml $min^{-1}$ of $CO_2$ flow and 800° C. are shown below. In these examples, an annealing temperature was varied from 800° C. to 900° C. Influence of the parameters on the resultant carbon powder was determined by $N_2$ adsorption analyses.

Figure 15:
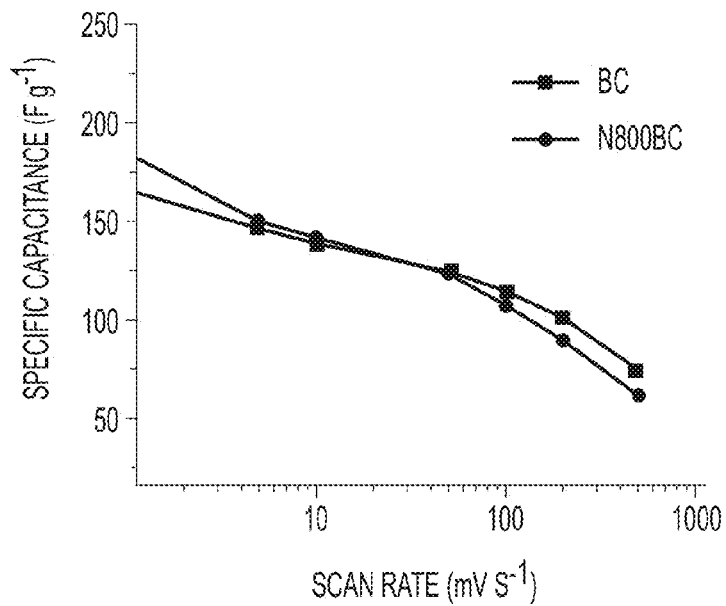
FIG. 15 shows specific capacitance values at different CV scan rates for selected sample carbons prepared with different combinations of annealing, ball-milling, and activation.

Table 4 shows two selected samples and their corresponding specific surface area ($m^2$ $g^{-1}$) and pore volume ($cm^3$ $g^{-1}$). FIG. 15 shows specific capacitance values at different CV scan rates for the selected sample carbons in Table 4 prepared with different combinations of annealing, ball-milling, and activation.

TABLE 4

| Sample | Annealing Temperature (° C.) | $S_{BET}$ ($m^2 g^{-1}$) | Pore volume ($cm^3 g^{-1}$) |
| --- | --- | --- | --- |
| N800BC | 800 | 1573 | 0.64344 |
| N900BC | 900 | 1388 | 0.61131 |

As can be seen here, higher temperature annealing may actually result in a lower specific surface area. The combination of activation and ball milling techniques may not be appropriate for designs with certain desired characteristics because certain preparation conditions needed for those desired characteristics may be incompatible with each other. For example, for designs on which annealing and/or ball milling are performed prior to activation, relatively poor specific surface area may result, correlating with relatively low specific capacitance.

High-Pressure Vapor Deposition Example Synthesis Method

The further use of a high-pressure vapor deposition system may greatly diminish deposition time, while simultaneously increasing production volume and lowering the cost of the deposition process. In such embodiments, the hydrocarbon gas quickly condenses in the zeolite pores at low temperatures and elevated pressures, because of the strong interactions between the pore walls and gas molecules. Due to the small (e.g., less than about 2 nm) pore size, the interaction potentials between the adsorbent molecules and each side of the pore wall overlap, leading to the high heat of hydrocarbon gas adsorption and the resultant high density of the liquefied gas in the nanopores of zeolite powder. Rapid heating to 700° C. and above may lead to rapid carbonization of the hydrocarbons and the formation of uniform carbon coatings. After carbon deposition, the powder may be ball-milled, for example, to remove the dense carbon surface layer and placed into an etchant bath to remove the zeolite template, as discussed above. Subsequently, a thermal treatment may be employed to remove volatile impurities.

Similar to the previously described examples of low-pressure vapor deposition and high-pressure solvo-thermal or hydrothermal deposition of carbon, high-pressure vapor deposition tends to form an additional dense layer of carbon on the surface of the resulting structures that may impede rapid diffusion of organic electrolyte ions into and out of the bulk of the porous carbon particles. As previously described, milling (such as ball milling) can be effectively utilized to at least partially remove such a layer or introduce defects and pores within this layer to enhance the diffusion rate of electrolyte ions therethrough.

As described herein, improved supercapacitors, components, and other related materials and manufacturing processes thereof are provided to reproducibly synthesize low-cost, environmentally friendly, mass-producible porous carbons with high specific surface area (e.g., about 2634 $m^2$ $g^{-1}$, close to the theoretical limit for graphene of approximately 2600 $m^2$ $g^{-1}$). Outstanding performance in supercapacitors based on organic electrolytes in particular may be achieved by various embodiments herein. Such porous carbons have been shown to have a specific capacitance greater than about 240 F/g and a frequency response greater than about 0.3 Hz (characteristic charge/discharge time less than 3.3 seconds), which represents a significant advancement over the state of the art.

Figure 16:
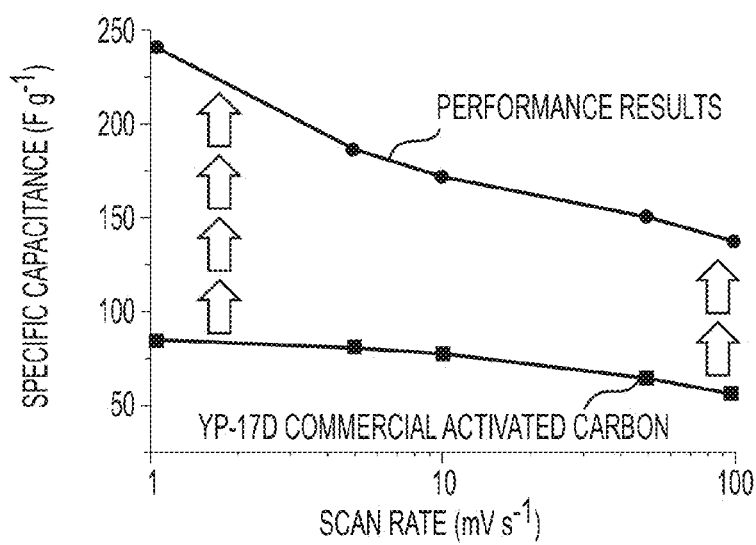
FIG. 16 provides a performance comparison between an example embodiment produced by the methods herein and a commercial activated carbon (YP-17D) used in the majority of organic electrolyte-based supercapacitors.

FIG. 16 provides a performance comparison between an example embodiment produced by the methods herein and a commercial activated carbon (YP-17D) used in the majority of organic electrolyte-based supercapacitors. As shown, the synthesized porous carbons herein offer 150% higher specific capacitance, which translates into 150% higher energy density of fabricated devices. Further, nearly an order of magnitude lower cost and little-to-no batch-to-batch variation in the resultant properties may be achieved due to the identical structure of the zeolite templates and the gaseous hydrocarbon precursor employed.

Figure 17:
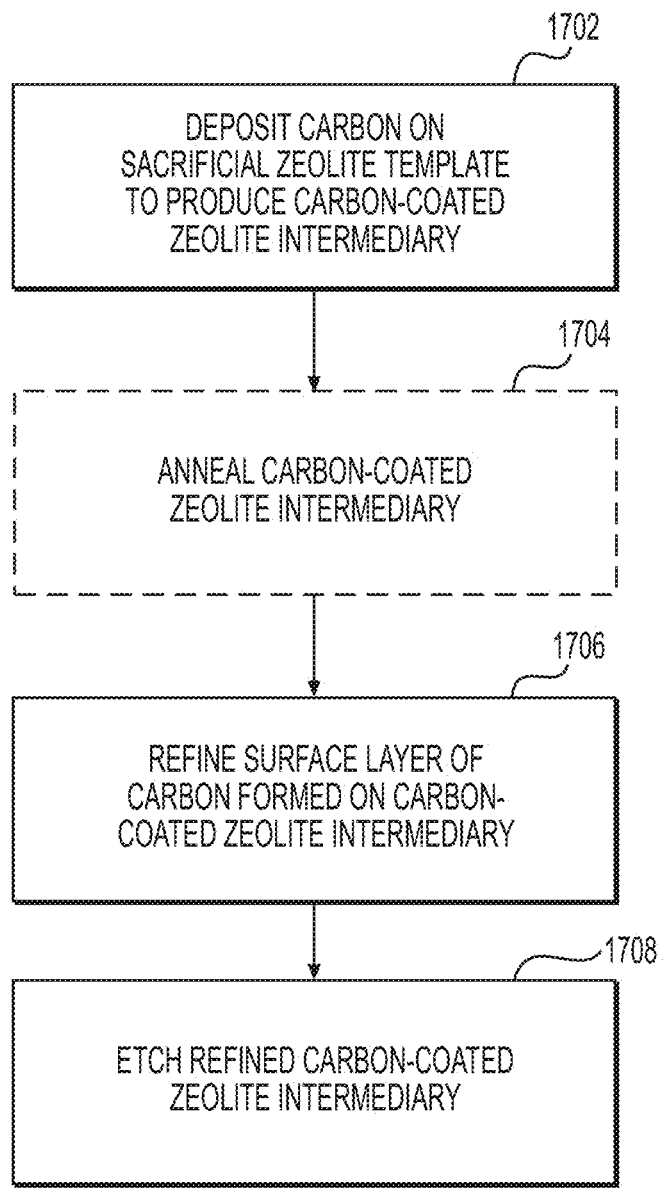
FIG. 17 is a flow diagram illustrating an example method for producing a microporous carbon matrix material composition for use in supercapacitor electrodes according to various embodiments

FIG. 17 is a flow diagram illustrating an example method for producing a microporous carbon matrix material composition for use in supercapacitor electrodes according to various embodiments. In this example, carbon is deposited on a sacrificial zeolite template via one of the methods described above (e.g., hydrothermal or solvo-thermal deposition, sub-atmospheric vapor phase deposition, or high-pressure infiltration of hydrocarbon vapors) to produce a carbon-coated zeolite intermediary (block 1702). A surface layer of carbon formed on the carbon-coated zeolite intermediary may then be refined (block 1706) and the refined carbon-coated zeolite intermediary may be etched to produce a microporous carbon matrix having a substantially uniform structure and substantially aligned pores (block 1708). In some embodiments, the carbon-coated zeolite intermediary may be annealed after deposition (optional block 1704).

In some embodiments, the refining may comprise physical activation of the surface layer to enlarge pores present therein. The physical activation may comprise, for example, heating the carbon-coated zeolite intermediary to a temperature in the range of about 700° C. to about 900° C. In other embodiments, the refining may comprise milling (e.g., ball milling) the carbon-coated zeolite intermediary to remove at least a portion of the surface layer. As described above, annealing of the carbon-coated zeolite intermediary may be performed, for example, at a temperature in the range of about 750° C. to about 1000° C., prior to or after the ball milling, to improve pore alignment in the microporous carbon matrix.

In still other embodiments, the refining may comprises a combination of refining procedures, such as physical activation of the surface layer to enlarge pores present therein, ball milling the carbon-coated zeolite intermediary to remove at least a portion of the surface layer, and/or annealing the carbon-coated zeolite intermediary to improve pore alignment in the microporous carbon matrix.

In any case, the microporous carbon matrix thus produced can be used to prepare a corresponding supercapacitor (e.g., in conjunction with an organic electrolyte).

The preceding description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention, which should only be defined by the following claims and all equivalents.

The invention claimed is:

1. A method of producing a microporous carbon matrix material composition for use in supercapacitor electrodes, comprising:
   depositing carbon on a sacrificial zeolite template via hydrothermal or solvo-thermal deposition to produce a carbon-coated zeolite intermediary;
   refining a surface layer of carbon formed on the carbon-coated zeolite intermediary; and
   etching the refined carbon-coated zeolite intermediary to produce a microporous carbon matrix having a substantially uniform structure and substantially aligned pores.

2. The method of claim 1, further comprising annealing the carbon-coated zeolite intermediary after deposition.

3. The method of claim 1, wherein the refining comprises physical activation of the surface layer to enlarge pores present therein.

4. The method of claim 3, wherein the physical activation comprises heating the carbon-coated zeolite intermediary to a temperature in the range of about 700° C. to about 900° C.

5. The method of claim 1, wherein the refining comprises milling the carbon-coated zeolite intermediary to remove at least a portion of the surface layer.

6. The method of claim 5, wherein the milling comprises ball milling.

7. The method of claim 6, further comprising annealing the carbon-coated zeolite intermediary at a temperature in the range of about 750° C. to about 1000° C. prior to the ball milling to improve pore alignment in the microporous carbon matrix.

8. The method of claim 6, further comprising annealing the carbon-coated zeolite intermediary at a temperature in the range of about 750° C. to about 1000° C. after the ball milling to improve pore alignment in the microporous carbon matrix.

9. The method of claim 1, wherein the refining comprises:
   physical activation of the surface layer to enlarge pores present therein; and
   ball milling the carbon-coated zeolite intermediary to remove at least a portion of the surface layer.

10. The method of claim 9, further comprising annealing the carbon-coated zeolite intermediary prior to or after the ball milling to improve pore alignment in the microporous carbon matrix.

11. The method of claim 10, wherein the annealing is performed after the physical activation.

12. The method of claim 1, further comprising preparing a supercapacitor from the microporous carbon matrix and an organic electrolyte.

13. A method of producing a microporous carbon matrix material composition for use in supercapacitor electrodes, comprising:
   depositing carbon on a sacrificial zeolite template via sub-atmospheric vapor phase deposition to produce a carbon-coated zeolite intermediary;
   refining a surface layer of carbon formed on the carbon-coated zeolite intermediary; and
   etching the refined carbon-coated zeolite intermediary to produce a microporous carbon matrix having a substantially uniform structure and substantially aligned pores.

14. The method of claim 13, wherein the refining comprises physical activation of the surface layer to enlarge pores present therein and/or ball milling the carbon-coated zeolite intermediary to remove at least a portion of the surface layer.

15. The method of claim 13, further comprising preparing a supercapacitor from the microporous carbon matrix and an organic electrolyte.

16. A method of producing a microporous carbon matrix material composition for use in supercapacitor electrodes, comprising:
   depositing carbon on a sacrificial zeolite template via high-pressure infiltration of hydrocarbon vapors to produce a carbon-coated zeolite intermediary;
   refining a surface layer of carbon formed on the carbon-coated zeolite intermediary; and etching the refined carbon-coated zeolite intermediary to produce a microporous carbon matrix having a substantially uniform structure and substantially aligned pores.

17. The method of claim 16, wherein the depositing is performed at or above three atmospheres of pressure.

18. The method of claim 16, wherein the depositing comprises:
flowing a hydrocarbon gas over the sacrificial zeolite template at a substantially low temperature and elevated pressure to liquefy the hydrocarbon gas in the pores of the sacrificial zeolite template; and
carbonizing the carbon-coated zeolite intermediary after flowing the hydrocarbon gas.

19. The method of claim 16, wherein the refining comprises physical activation of the surface layer to enlarge pores present therein and/or ball milling the carbon-coated zeolite intermediary to remove at least a portion of the surface layer.

20. The method of claim 16, further comprising preparing a supercapacitor from the microporous carbon matrix and an organic electrolyte.

* * * * *